Jan. 28, 1969   E. S. HOELSCH   3,424,430
SWINGABLY SUPPORTED VALVE
Filed Oct. 31, 1966

United States Patent Office 3,424,430
Patented Jan. 28, 1969

3,424,430
SWINGABLY SUPPORTED VALVE
Edward S. Hoelsch, deceased, late of Worcester, Mass., by Madeleine M. Hoelsch, administratrix, Worcester, Mass., assignor to Hays Manufacturing Company, Erie, Pa., a corporation of Pennsylvania
Filed Oct. 31, 1966, Ser. No. 591,013
U.S. Cl. 251—148  7 Claims
Int. Cl. F16k *1/16, 51/00;* F16l *29/00*

ABSTRACT OF THE DISCLOSURE

A valve made up of two fittings that may be supported in a fluid line and a valve body that is swingably supported between the two fittings. The valve body and fittings are secured by a pair of bolts extending through flanges on the fittings and a pair of ears on the valve body. One ear has a bore therethrough which serves as a pivot when the bolts are loosened. The other ear is notched, allowing the valve body to be swung out of the flow line for repair or replacement.

---

This invention relates to valves and more particularly to valves for use in fluid lines and the like.

The valve disclosed herein is made up of two fittings that may be supported in a fluid line and a valve body that is swingably supported between the two fittings so that it can be swung into position between the fittings in the line to control the flow of the fluid through the line or it can be swung out of position for repair or replacement.

The valve fittings are held together by bolts which maintain the two parts in alignment with each other. The fittings can be brazed into the line. The valve has a particular ball plug which is easy to rotate. Previous ball valves have had a problem in that they do not seal on the upstream face nor do they seal on the downstream at low pressure. Applicant has provided a resilient member in the valve body which acts as a spring to cause the valve to seal at any pressure. Applicant has further provided grease in the valve to act as a seal so that this lubrication results in leaking valves holding against leakage.

It is an object of the invention to provide an improved plug valve.

Another object of the invention is to provide a plug valve that can be swung into and out of position between two fittings for repair or replacement.

Another object of the invention is to provide an improved sealing means for a plug valve.

Another object of the invention is to provide a plug valve that is simple in construction, economical to repair, and economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
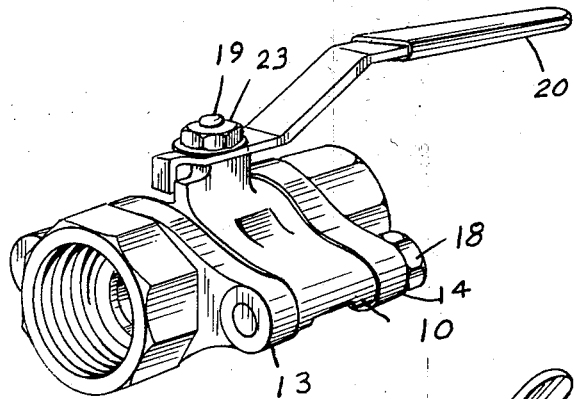
FIG. 1 is an isometric view of a valve according to the invention.

Now with more particular reference to the drawing, the valve as shown has a body 19 and fittings 11 and 12 having threaded fittings on the ends indicated at 15 and 16 for attaching the valve in a fluid line such as a water line. The fittings have flanges 13 and 14 with laterally extending ears that receive bolts 17 and 18. The bolts 17 and 18 could be threadably received in each of the ears and they could have threads of opposite pitch on the two ends so that the fittings could be jacked apart when removing the valve in order to make the body 10 swing out of engagement easier.

The valve has a stem 19 with a handle 20 held in place thereon by means of a nut 23 so that the plug indicated as a ball or sphere can be easily rotated. The plug ball 21 sealingly engages the seat 22 which may be made of nylon or of some other self-lubricating material. The fittings each have passages 24 and 26 that communicate with passage 25 through the ball when the valve is in open position and are moved out of alignment with each other when the handle 20 is rotated.

The fittings have counterbores that receive the insert gaskets 28 and 29. These insert gaskets extend outwardly beyond the face of the end of the fittings adjacent the valve so that when the bolts 17 and 18 are tightened the gaskets form sealing engagement with the end of the valve. These resilient gaskets also act as springs to compress the seat insert 22. A notch 35 can be formed in the fitting or it could be formed in the valve to receive the end of a screwdriver. Thus the fittings could be forced from the valve body when bolts 17 are loosened.

Figure 2:
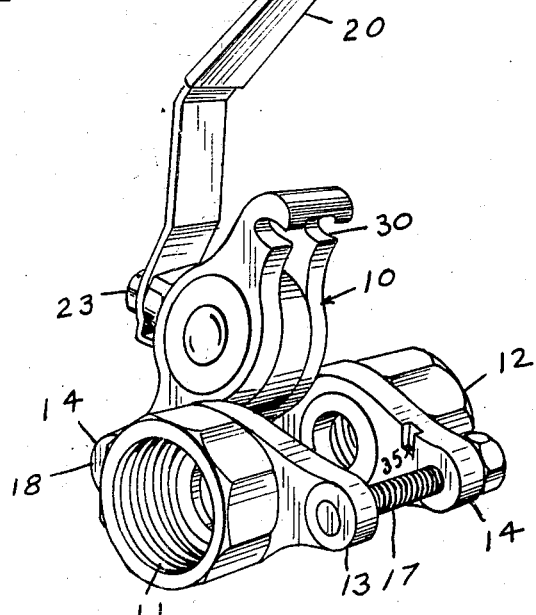
FIG. 2 is a view similar to FIG. 1, showing the valve body swung out of the line for repair or replacement.
Figure 3:
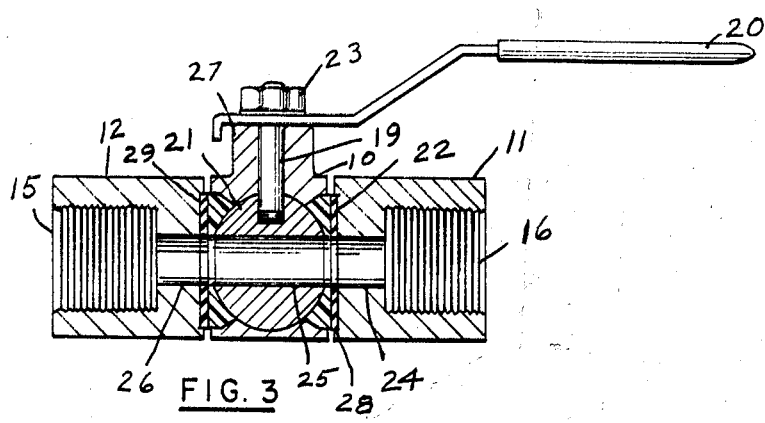
FIG. 3 is a longitudinal cross-sectional view taken on the center line of the valve shown in FIG. 1.

It will be noted that the bolt 17 is received in a slot 30 in the plug 27 which positively locates the valve body. When the bolts are loosened and they jack the fittings apart the body can easily be swung to the position shown in FIG. 2.

By making a slot 30 in each ear 14, the valve body 10 can be lifted out and replaced.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a valve body,
   two spaced fittings,
   means supporting said fittings in spaced relation to each other,
   means on each said fittings for attaching it to a pipe line,
   means for drawing said fittings toward each other thereby clamping said valve body between said fittings,
   said fittings having flanges thereon terminating in an opening at each side,
   a bolt through each said opening,
   spaced ears on each side of said body,
   one said bolt passing through one said ear on said valve,
   valve means on said body for controlling the flow therethrough,
   one said valve ear having a notch in the lower side thereof adapted to receive one said bolt whereby said body can be swung upward out of said pipe line when said bolts are loosened,
   and means on said body cooperating with means on said fittings whereby said valve body is sealed in fluid tight relation between said fittings.

2. The valve recited in claim 1 wherein each said fitting has a counterbore therein, a resilient member in each said counterbore, said resilient member extending from said fitting and adapted to sealingly engage said valve means, and a flow passage through said fittings, body, and through said resilient members.

3. The valve recited in claim 1 wherein said means for turning said flow therethrough off and on comprises a valve plug.

4. The combination recited in claim 3 wherein said valve plug is in the form of a sphere.

5. The combination recited in claim 4 wherein a spherical seat made of a self-lubricating plastic is supported in said valve body and seatingly receives said valve plug.

6. The valve recited in claim 5 wherein a resilient member is disposed in said body on the upstream side and on the downstream side of said plug whereby said plug is forced into sealing engagement with said seat members.

7. The valve recited in claim 1 wherein said bolts each threadably engage each said opening, said bolts each have one end threaded right hand and the other left whereby said fittings may be jacked apart.

References Cited

UNITED STATES PATENTS

| | | | |
|---|---|---|---|
| 847,594 | 3/1907 | McCreary | 151—16 |
| 2,653,839 | 9/1953 | Middendorf | 287—60 |
| 3,056,577 | 10/1962 | Kulisek | 251—315 |
| 3,072,139 | 1/1963 | Mosites | 251—317 |
| 3,146,792 | 9/1964 | Donnelly et al. | 251—315 |
| 3,202,175 | 8/1965 | Dumm | 251—315 |
| 3,206,164 | 9/1965 | Yopp | 251—315 |
| 3,233,861 | 2/1966 | Stillwagon | 251—148 |
| 3,356,337 | 12/1967 | Olen | 251—315 |

M. CARY NELSON, *Primary Examiner.*

WILLIAM R. CLINE, *Assistant Examiner.*